Patented Sept. 19, 1922.

1,429,514

UNITED STATES PATENT OFFICE.

HARRY F. LEWIS, OF BUFFALO, NEW YORK, ASSIGNOR TO NATIONAL ANILINE & CHEMICAL COMPANY, INC., OF NEW YORK, N. Y., A CORPORATION OF NEW YORK.

PURIFICATION OF ANTHRAQUINONE.

No Drawing. Application filed December 22, 1920. Serial No. 432,400.

*To all whom it may concern:*

Be it known that I, HARRY F. LEWIS, a citizen of the United States, residing at Buffalo, in the county of Erie, State of New York, have invented certain new and useful Improvements in the Purification of Anthraquinone; and I do hereby declare the following to be a full, clear, and exact description of the invention, such as will enable others skilled in the art to which it appertains to make and use the same.

This invention relates to the purification of impure anthraquinone, and more particularly to the purification of anthraquinone from other oxidation products, and from certain hydrocarbons, such as phenanthrene, etc., in a simple and advantageous manner.

In the production of anthraquinone by oxidizing anthracene, for example, with a solution of chromic acid, or with an acid solution of sodium or potassium dichromate, such impurities as are admixed with the anthracene are subjected to the same oxidizing agent or agents as is the anthracene itself. As a result, the anthraquinone produced, after dissolving out the constituents which are soluble in water or in the acid solution, contains various impurities in admixture therewith. The nature and amount of the impurities will vary somewhat with the method of production and also with the purity of the anthracene used as the starting material for the oxidation. Thus, where the anthracene contains other hydrocarbons or nitrogenous bases admixed therewith, such as phenanthrene, fluorene, picene, acenaphthene, methylanthracene, pyrene, chrysene, retene, carbazol, etc., the anthraquinone produced will contain any unchanged anthracene or other hydrocarbons, or nitrogenous bases, and any oxidation products thereof, such as varying amounts of part or all of the following materials, namely, diphenic acid, carbazol and its oxidation products, other nitrogenous substances and their oxidation products, etc. The purification of the impure anthraquinone accordingly involves separating the anthraquinone from such impurities.

The present invention is based upon the discovery that impure anthraquinone, containing impurities of the character above referred to, can be purified and materially improved by dissolving the anthraquinone, together with soluble impurities, in an organic solvent such as chlorbenzol or crude o-dichlor-benzol ("Solvent 74"), while the solvent is heated, and that, upon cooling the resulting solution, the anthraquinone can be separated by crystallization from solution in a purified state while the impurities for the most part remain in solution in the cooled solvent.

While anthraquinone is but slightly soluble in such solvents in the cold, I have found that the hot solvents have such a marked solvent action that a considerable amount of anthraquinone can be dissolved therein, along with soluble impurities, and that, upon cooling the resulting solution, the anthraquinone will be again separated from solution in a crystalline state, while the solvents have such a marked action upon the impurities that these will, to a very considerable extent, remain in solution and can thereby be separated from the purified anthraquinone.

The dissolving of the anthraquinone, as well as the impurities, by the use of the hot solvent, enables a further purification to be effected of the anthraquinone from the insoluble impurities. That is, the hot solution of anthraquinone and soluble impurities can be filtered off or otherwise separated from the insoluble impurities, and a partial purification thereby effected, while the subsequent cooling of the solution with crystallization out of solution of the dissolved anthraquinone brings about a further purification. The complete purification process, therefore, separates the impurities insoluble in the solvent as well as the impurities which are readily soluble therein, while the purification of the anthraquinone is further promoted by the solution and recrystallization which it undergoes.

The solvents of the character above mentioned, such as chlorbenzol or crude o-dichlor-benzol, have such a pronounced solvent action upon many of the impurities of anthraquinone that an improved purification of the impure anthraquinone can be brought about merely by extracting the impure anthraquinone in the cold, that is, at ordinary temperatures and without heating the solvents. This method of purification forms the subject matter of my prior application, Serial No. 369,641, filed March 29, 1920. In the present invention, advantage is taken of this same difference in solubility, which I have discovered many of the impurities to have, and, in addition, advantage is taken of the further discovery that, by the use of the solvent while hot, the anthraquinone itself can be dissolved and separated from insoluble impurities and further purified by recrystallization, while the same readily soluble impurities remain in solution and are thereby separated.

The impurities which are removed from the impure anthraquinone, according to the process of the present invention, are such impurities as are insoluble in the hot solvent, and the easily soluble impurities, particularly the oxidation products of carbazol and other nitrogen bases, as well as certain of the hydrocarbons sometimes present, such as phenanthrene, etc., and their oxidation products, and also such oxidation products as contain chromium as a constituent.

In carrying out the improved process of the present invention I dissolve the crude anthraquinone in the solvent, for example, crude o-dichlor-benzol ("Solvent 74") while the solvent is heated, preferably to the boiling temperature, and I make use of a sufficient amount of the solvent to dissolve all of the anthraquinone. I then filter or otherwise separate the resulting solution, while still hot, from insoluble impurities and I then cool the resulting solution, preferably to a temperature of 10 to 25° C. This brings about a separation, by crystallization, of the anthraquinone in a purified state. I then separate the purified anthraquinone from the accompanying solution of soluble impurities, by filtration or otherwise. The purified anthraquinone is then washed with the same solvent in amount sufficient to remove the mother liquor from the purified product and the last traces of the solvent are removed by drying the purified anthraquinone at a suitable temperature and preferably under a reduced pressure.

The purification of the impure or crude anthraquinone can be repeated one or more times, as where the impure anthraquinone contains a large amount of impurities. The anthraquinone first separated can thus be subjected to a further solution and crystallization until such impurities as escape separation in the first purification have been subsequently removed. So also, where the anthraquinone contains but a relatively small amount of impurities, the solvent containing the soluble impurities therein can be used over again for the purification of further amounts of anthraquinone.

The invention will be further illustrated by the following specific example, the parts being by weight: 100 parts of crude anthraquinone produced by the chromic oxidation process, are added to 1000 parts of technical o-dichlor-benzol, known in the trade as "Solvent 74" (manufactured by the Hooker Electro Chemical Company) which has been heated to the boiling point, and the mixture is agitated at that temperature for about 30 minutes or until solution of the anthraquinone has been effected. The impurities insoluble in the hot solvent are removed by filtration at the temperature of the solvent, i. e., without cooling. The hot solution thus obtained, and consisting of the anthraquinone and impurities soluble under the conditions of the example, is cooled preferably from 10 to 25°, whereupon a large part of the anthraquinone crystallizes from solution, together with any impurity insoluble under the conditions of the example. The anthraquinone thus crystallized from the solution is filtered off, washed with the same solvent in amount sufficient to remove the mother liquor, and the last traces of solvent removed by drying, preferably under reduced pressure. The purified product, obtained in this way, is of high purity. The purity will, of course, vary somewhat with different impure products and with the amount of impurities. If the impurities are large in amount, a repetition of the purification operation may result in a further purification; whereas, if the product is not particularly impure, a single purification may give a product of sufficiently high purity for use without further purification, for example, in the preparation of intermediates and dyestuffs. I have thus obtained an anthraquinone of 99% purity or higher, for example, from anthraquinone of about 88% purity.

Instead of operating at the boiling point, as in the specific example, it is possible to carry out the operation at a lower temperature with the use of an increased amount of the solvent. So also, the operation can be carried out on the countercurrent principle, for example, by subjecting separate batches of impure anthraquinone to successive extraction in such a way that the partially extracted material is subjected to the action of the fresh solvent, and the resulting solution only partly saturated with impurities is used in extracting fresh amounts of impure anthraquinone.

The process of the present invention is applicable not only to the crude anthraquinone produced by the oxidation of anthracene by a chromic acid mixture, but also to the purification of commercial anthraquinone produced by other processes, or preliminarily purified by other methods of purification, where it is still admixed with impurities of the character above referred to. Furthermore, the anthraquinone purified according to the process of the present invention can itself be subjected to further purification for the removal therefrom of such impurities as may not be removed by the present process. That is, the process of the present invention can be combined with other purification processes, to which the anthraquinone is preliminarily subjected, or to which it is subsequently subjected.

The process of the present invention is not dependent upon any particular kind of apparatus and can be carried out in different forms of apparatus. An iron kettle equipped with a stirrer and with steam and cooling coils is well adapted for use.

The process of the present invention provides a cheap and rapid method for the purification of crude anthraquinone or the purification of partially purified anthraquinone, in order to give a product of materially increased purity.

In my prior application, Serial No. 369,641, filed March 29, 1920, I have specifically claimed the process of purification in which the impure anthraquinone is treated with chlorbenzol for the separation of the anthraquinone from soluble impurities; while in the specific claims of the present case I have claimed specifically the process in which technical o-dichlor-benzol is employed, and I have included claims for the use of this solvent for the purification of impure anthraquinone, regardless of whether the anthraquinone is itself dissolved and recrystallized as well as more specific claims for the process of the present invention carried out with dissolving of the anthraquinone itself in the hot o-dichlor-benzol solvent and subsequent recrystallization therefrom.

I claim:

1. The method of purifying impure anthraquinone which comprises dissolving the anthraquinone, together with soluble impurities, in a hot halogenated aromatic hydrocarbon solvent, cooling the resulting solution to crystallize the anthraquinone therefrom, and separating the resulting solution of impurities from the purified anthraquinone.

2. The method of purifying impure anthraquinone which comprises dissolving the same in a hot chlorbenzol solvent, cooling the solvent to crystallize the anthraquinone therefrom and separating the resulting solution of impurities from the purified anthraquinone.

3. The method of purifying impure anthraquinone which comprises re-crystallizing the same from a poly-halogenated aromatic hydrocarbon solvent, and separating the resulting solution of impurities from the purified anthraquinone.

4. The method of purifying impure anthraquinone which comprises subjecting the same to the action of a dichlor-benzol solvent and separating the resulting solution of impurities from the anthraquinone.

5. The method of purifying impure anthraquinone which comprises dissolving the same together with soluble impurities in hot technical o-dichlor-benzol, cooling the resulting solution to crystallize the anthraquinone therefrom, and separating the resulting solution of impurities from the purified anthraquinone.

6. The method of purifying impure anthraquinone which comprises dissolving the anthraquinone together with soluble impurities in a hot halogenated hydrocarbon solvent, separating the resulting hot solution from insoluble impurities, crystallizing anthraquinone from the resulting solution, and separating the remaining solution of impurities from the purified anthraquinone.

7. The method of purifying impure anthraquinone which comprises subjecting the same to the action of technical o-dichlor-benzol, separating the resulting solution of impurities from the purified anthraquinone, recovering the extracted impurities from the solvent, and returning the solvent for further use in the purification of further amounts of impure anthraquinone.

8. The method of purifying impure anthraquinone which comprises subjecting the same to the action of technical o-dichlor-benzol, separating the resulting solution from the purified anthraquinone, treating the purified anthraquinone with fresh amounts of the same solvent, and utilizing the resulting solution for the purification of further amounts of impure anthraquinone.

9. The method of purifying impure anthraquinone which comprises subjecting the same to crystallization from technical o-dichlor-benzol, separating the resulting solution from the purified anthraquinone, and repeating crystallization from further amounts of the solvent to effect the extraction of further amounts of impurities.

10. The method of purifying impure anthraquinone which comprises dissolving the anthraquinone, together with soluble impurities, in hot technical o-dichlor-benzol, separating the resulting hot solution from insoluble impurities, crystallizing anthraquinone from the resulting solution by cooling, and separating the remaining solution of impurities from the purified anthraquinone.

In testimony whereof I affix my signature.

HARRY F. LEWIS.